(12) United States Patent
Lu et al.

(10) Patent No.: US 12,411,370 B2
(45) Date of Patent: Sep. 9, 2025

(54) HIGH EXTINCTION-RATIO OPTICAL ROTATOR

(71) Applicant: Fujian Hitronics Technologies, Inc., Fuzhou (CN)

(72) Inventors: Denglian Lu, Fuzhou (CN); Xingduan Huang, Fuzhou (CN); Shi Chen, Fuzhou (CN); Guanglei Ding, Fuzhou (CN); Shaofeng Zhang, Fuzhou (CN)

(73) Assignee: Fujian Hitronics Technologies, Inc., Fuzhou (CN)

( * ) Notice: Subject to any disclaimer, the term of this patent is extended or adjusted under 35 U.S.C. 154(b) by 372 days.

(21) Appl. No.: 18/192,962

(22) Filed: Mar. 30, 2023

(65) Prior Publication Data
US 2023/0359071 A1 Nov. 9, 2023

(51) Int. Cl.
*G02F 1/01* (2006.01)
*G02F 1/09* (2006.01)

(52) U.S. Cl.
CPC ............ *G02F 1/093* (2013.01); *G02F 1/0136* (2013.01)

(58) Field of Classification Search
CPC ............................... G02F 1/093; G02F 1/0136
See application file for complete search history.

(56) References Cited

U.S. PATENT DOCUMENTS 5,689,360 A * 11/1997 Kurata ................... G02B 6/272
359/485.02

\* cited by examiner

*Primary Examiner* — Jamara A Franklin
(74) *Attorney, Agent, or Firm* — SV Patent Service

(57) ABSTRACT

A high extinction-ratio rotator includes a collimator that can collimate a signal light from an optical fiber, a pair of polarizing splitting prisms that include a first birefringence crystal wedge and a second birefringent crystal wedge, that can separate two orthogonal polarization components of the signal light into a vertically polarized light and a horizontally polarized light, a non-reciprocal 45-degree polarization rotator which the vertically polarized light and the horizontally polarized light exiting the pair of polarizing splitting prisms pass through, and a reflector. The vertically polarized light and the horizontally polarized light exiting the non-reciprocal 45-degree polarization rotator intersect on a surface of the reflector and are reflected back into the non-reciprocal 45-degree polarization rotator.

13 Claims, 5 Drawing Sheets

HIGH EXTINCTION-RATIO OPTICAL ROTATOR

BACKGROUND OF THE INVENTION

The invention relates to the field of laser technology, and in particular, to an optical rotator with high extinction ratio.

Optical rotators are widely used in the fields of interferometry, communication, and laser radar. The optical rotator is very effective in improving the performance of fiber interferometer such as fiber amplifier and fiber laser. When an optical rotator is placed at the end of a single-mode fiber, the effect of polarization state change caused by thermal or mechanical disturbance at any position of the fiber can be eliminated. A linear polarizer can be used to filter the laser light exiting the optical rotator, but 50% of the intensity can be lost in the filtering of the linear polarizer.

However, common optical rotators generally use a combination of Faraday rotator and reflector. In these optical rotators, the fabrication tolerance of Faraday rotator, and the wavelength and temperature changes in the Faraday rotator itself can cause the rotation angle to change. Thus, the polarization state of the beam cannot be accurately compensated, which leads to a decrease in the actual extinction ratio.

SUMMARY OF THE INVENTION

To overcome the disadvantage of the conventional optical rotators, the present disclosure invention provides a high extinction-ratio rotator, which can solve the problem of extinction ratio reduction caused by the change of rotation angle of Faraday rotator affected by temperature and wavelength variations, and fabrication variation in the optical rotators.

In order to achieve the above objectives, the following technical solution is adopted:

A high extinction-ratio optical rotator includes a collimator, a pair of polarizing splitting prisms, a non-reciprocal 45-degree polarization rotator, and a reflector mirror along the optical path. The pair of polarizing splitting prisms can be made of birefringent crystal wedges.

The collimator can be in the form of an optical fiber with its end faces connected with an endcap or a TEC (thermal expanded core) optical fiber to expand the beam of the light at the fiber face, which can reduce the optical energy density at the end face of the fiber and significantly increase the laser damage threshold.

The input signal light from the optical fiber is collimated by the collimator and incident to the pair of polarizing splitting prisms.

The pair of polarizing splitting prisms is composed of a first birefringent crystal wedge and a second birefringent crystal wedge, and the two wedge optical axis perpendicular to each other. The optical axis of the first birefringent crystal wedge is parallel to the vertical plane. The optical axis of the second birefringent crystal wedge is perpendicular to the vertical plane. The pair of polarizing splitting prisms separates the two orthogonal polarization components of the input signal light into a vertically polarized light and a horizontally polarized light by the polarizing splitting prism and the two polarized is orthogonal. The intersection point of vertically polarized light and horizontally polarized light is located on the surface of the reflector mirror. The polarization direction of the vertically polarized light is orthogonal to the vertical plane direction, and the polarization direction of the horizontally polarized light is parallel to the vertical plane direction.

A magnetic ring can provide a magnetic field for the polarization rotator at the upper and the lower sides of the non-reciprocal 45-degree polarization rotator, so that the non-reciprocal 45-degree polarization rotator can achieve a non-reciprocal rotation of the polarization direction.

The magnetic ring adopts a C-shaped magnetic ring, which is not a closed loop. The interaction between signal light and the rotating plate causes the magnetic field intensity on the rotating plate to change, and the changed magnetic field generates a vortex electric field. The C-shaped magnetic ring can horizontally polarize the vortex electric field from forming a closed loop on the magnetic ring, and thus preventing a vortex current from heating the magnetic ring.

A high extinction-ratio rotator includes a collimator that can collimate a signal light from an optical fiber, a pair of polarizing splitting prisms that include a first birefringent crystal wedge and a second birefringent crystal wedge, that can separate two orthogonal polarization components of the signal light into a vertically polarized light and a horizontally polarized light, a non-reciprocal 45-degree polarization rotator which the vertically polarized light and the horizontally polarized light exiting the pair of polarizing splitting prisms pass through, and a reflector. The vertically polarized light and the horizontally polarized light exiting the non-reciprocal 45-degree polarization rotator intersect on a surface of the reflector and are reflected back into the non-reciprocal 45-degree polarization rotator.

Further, in the disclosed he high extinction-ratio optical rotator, the wedge angles of the first birefringent crystal are $\alpha$ and $\beta$, and the optical axis azimuth of the parallel vertical plane $\theta$. The wedge angles of the second birefringent crystal are $\alpha$ and $\gamma$, and the optical axis is vertical to vertical plane. In one implementation, $\alpha=5.3°$, $\beta=4.5°$, $\gamma=4.9°$, $\theta=49.2°$.

The first birefringent crystal wedge and the second birefringent crystal wedge are bonded by photoresist to an integrated component.

Further, the non-reciprocal 45-degree polarization rotator and magnetic ring can be replaced with a latching rotator crystal having an intrinsic magnetic field.

Compared with the conventional technologies, the presently disclosed high extinction-ratio optical rotator can eliminate the deviation of the rotation angle of polarized light caused by the influence of temperature change, wavelength change, and fabrication variations of the optical rotator. The signal light passing through the polarizers can achieve a high extinction ratio.

BRIEF DESCRIPTION OF DRAWINGS

The present invention will be further described below in conjunction with the drawings and descriptions.

DETAILED DESCRIPTION OF THE INVENTION

The present invention will become apparent from the following detailed description of embodiments and from the accompanying drawings, but not limited to the scope of the invention in any way.

Example 1

Figure 1:
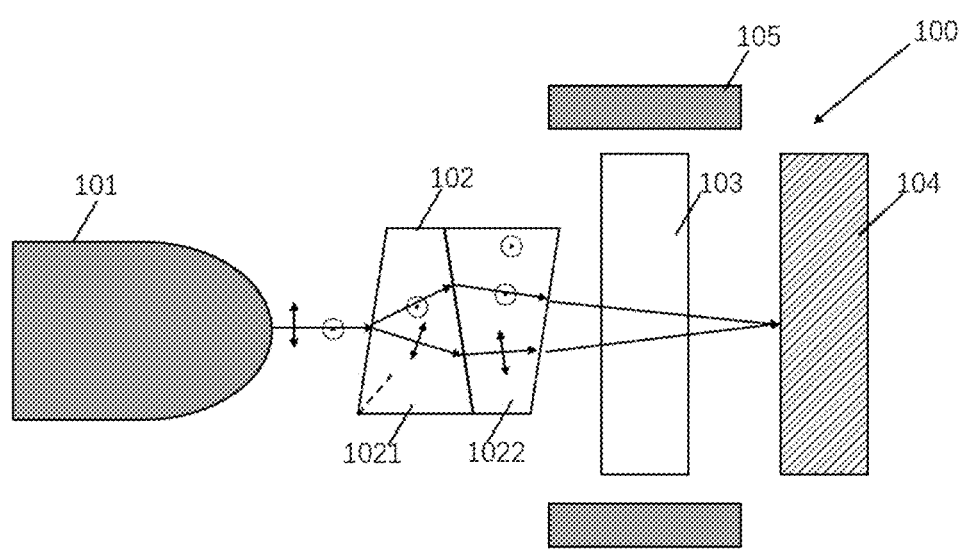
FIG. 1 is a schematic diagram of a high extinction-ratio optical rotator in accordance with some embodiments of the present invention.

Referring to FIG. 1, a high extinction-ratio rotator 100 includes a collimator 101, a pair of polarizing splitting prisms 102, a non-reciprocal 45-degree polarizing rotator 103, and a reflector 104.

The high extinction-ratio rotator 100 also includes a magnetic ring 105 that provides a magnetic field at upper and lower sides of the non-reciprocal 45-degree polarization rotator 103. The resulting magnetic field enables a non-reciprocal rotation of the polarization direction by the non-reciprocal 45-degree polarization rotator 103.

In some embodiments, instead of the non-reciprocal 45-degree polarization rotator 103 and the magnetic ring 105, the high extinction-ratio rotator 100 can include a non-reciprocal 45-degree polarization rotator within an intrinsic magnetic field without the need for an external magnet providing a magnetic field.

Figure 5:
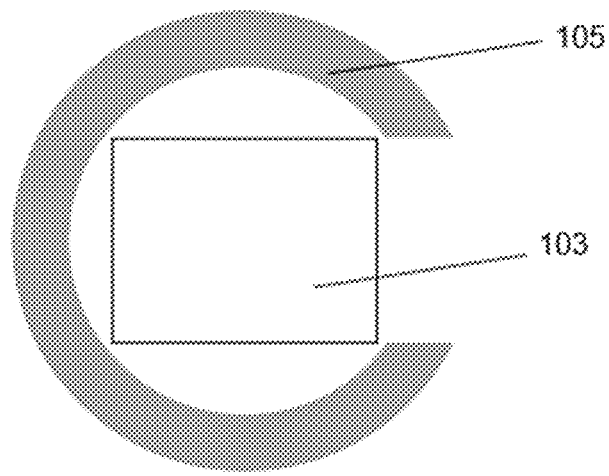
FIG. 5 shows the structure of a magnetic ring and a polarization rotator compatible with the high extinction-ratio optical rotator in accordance with some embodiments the present invention.

As shown in FIG. 5, the magnetic ring 105 can be implemented by a C-shaped non-closed magnetic ring structure.

The end faces of the optical fiber in collimator 101 is connected with an endcap or a TEC optical fiber to expand the beam of the light at the fiber face, which can reduce the optical energy density of the end face of the fiber and significantly increase the laser damage threshold.

Figure 2:
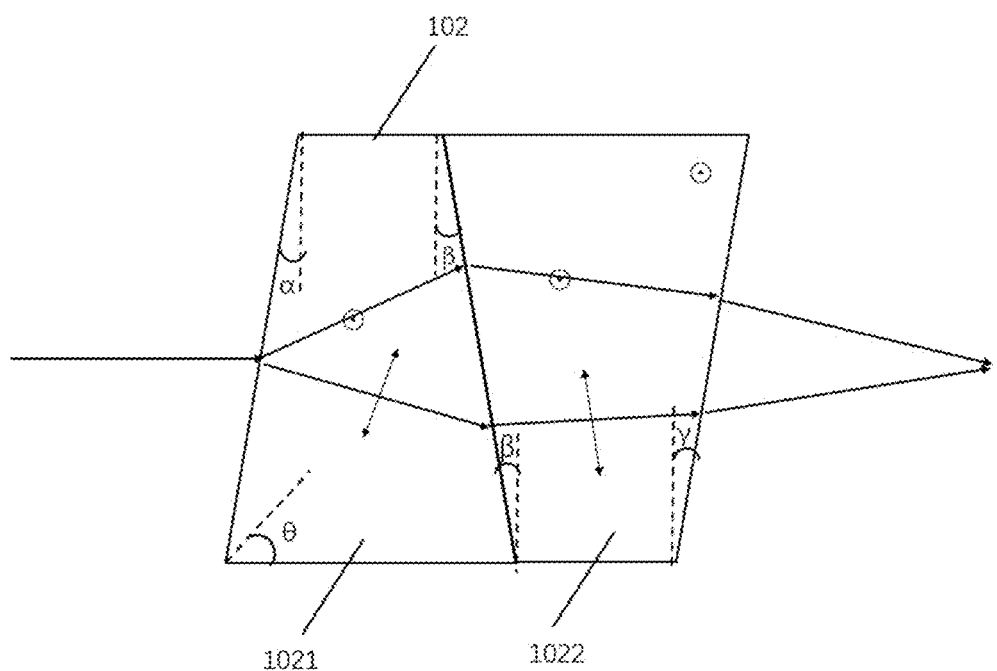
FIG. 2 is a schematic diagram of the structure of a pair of polarizing splitting prisms compatible with the high extinction-ratio optical rotator in accordance with some embodiments of the present invention.

Referring to FIG. 2, the pair of polarizing splitting prisms 102 is composed of a first birefringent crystal wedge 1021 and a second birefringent crystal wedge 1022. The first birefringent crystal wedge 1021 and the second birefringent crystal wedge 1022 are bonded into an integrated component with photoresist. The optical axis of the first birefringent crystal wedge 1021 is parallel to the vertical plane (paper direction). The optical axis of the second birefringent crystal wedge 1022 is perpendicular to the vertical plane. The wedge angles of the first birefringent crystal wedge 1021 are $\alpha$ and $\beta$. The optical axis azimuth angle of the parallel vertical plane is $\theta$. The wedge angles of the second birefringent crystal wedge 1022 are $\beta$ and $\gamma$. In an exemplified implementation, by setting $\alpha=5.3°$, $\beta=4.5°$, $\gamma=4.9°$, $\theta=49.2°$, the intersection point of the emitted vertically polarized light and horizontally polarized light falls on the surface of the reflector 104.

The signal light incident by the optical fiber is collimated by the collimator 101, and then incident horizontally to the pair of polarizing splitting prisms 102. The pair of polarizing splitting prisms 102 separates the two orthogonal polarization components of the input signal light: the signal light is divided into vertically polarized light and horizontally polarized light with orthogonal polarization state after passing through the pair of polarization splitting prisms 102. The vertically polarized light and horizontally polarized light intersect on the surface of the reflector 104 behind the pair of polarizing splitting prisms 102. The polarization direction of the vertically polarized light is perpendicular to the vertical direction, The polarization direction of horizontally polarized light is parallel to the vertical direction.

Figure 3:
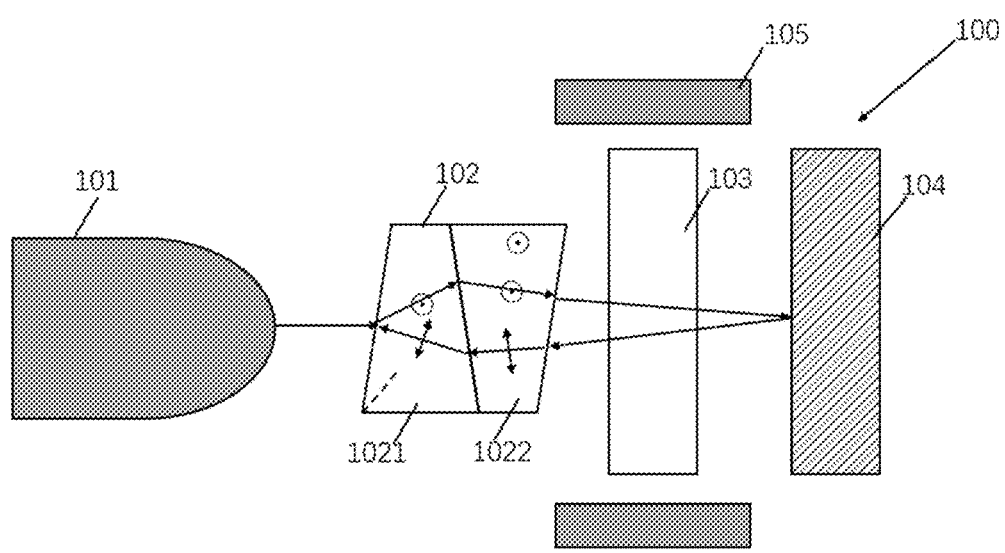
FIG. 3 is a schematic diagram of vertically polarized light transmission in a high extinction-ratio optical rotator in accordance with some embodiments of the present invention.

FIG. 3 illustrates the transmission optical path of the vertically polarized light separated by the pair of polarizing splitting prisms 102.

In the forward transmission path, the vertically polarized light passes through the non-reciprocal 45-degree polarization rotator 103, and then incident to the reflector mirror 104. After passing the non-reciprocal 45-degree polarization rotator 103, the polarization direction of the vertically polarized light cumulatively has rotated (45+A) degrees clockwise (viewed along the light transmission direction). Here A is the rotation angle deviation caused by the non-reciprocal 45-degree polarization rotator 103 (due to temperature change, wavelength change, and fabrication variation, etc. therein) in the forward transmission direction. The signal light reflected by the mirror 104 again passes through the non-reciprocal 45-degree polarization rotator 103, wherein its polarization direction cumulatively rotates (45+A) degrees counterclockwise (viewed along the light transmission direction). When the reflected signal light exits the non-reciprocal 45-degree polarization rotator 103, its polarization direction has rotated (90+2A) degrees in total in the forward and backward transmission directions.

In the backward transmission path, the previously vertically polarized light has its polarization state has rotated (90+2A) degrees. Only the polarization component of the previously vertically polarized light that is parallel to the horizontal direction can be directed by the pair of polarizing splitting prisms 102 and coupled back to the collimator in reverse to the forward transmission path of the horizontally polarized light. In contrast, the vertical polarization component of the previously vertically polarized light is deflected and cannot be coupled to the collimator 101 in the opposite transmission direction.

As a result, the rotation angle deviation of 2A caused by the non-reciprocal 45-degree polarization rotator 103 (due to temperature change, wavelength change, and fabrication variation, etc. therein) is eliminated, thus improving the extinction ratio.

Figure 4:
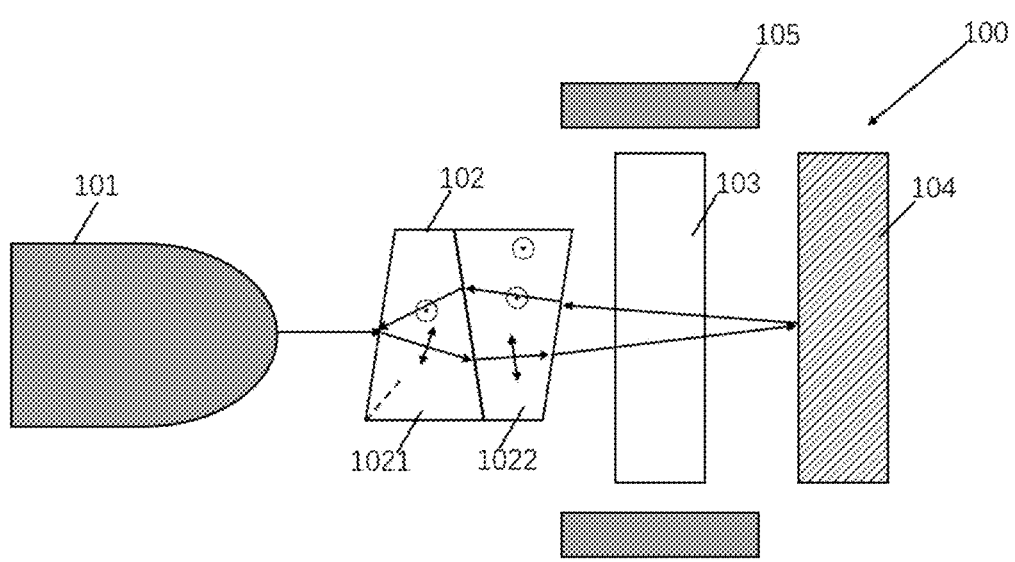
FIG. 4 is a schematic diagram of horizontally polarized light transmission in a high extinction-ratio optical rotator in accordance with some embodiments the present invention.

FIG. 4 illustrates the transmission optical path of the horizontally polarized light separated by the pair of polarizing splitting prisms 102.

In the forward transmission path, the horizontally polarized light passes through the non-reciprocal 45-degree polarization rotator 103, and then incident to the mirror 104. After passing the non-reciprocal 45-degree polarization rotator 103, the polarization direction of the horizontally polarized light cumulatively has rotated (45+A) degrees in the polarization direction clockwise (viewed along the light transmission direction). A is the rotation angle deviation caused by the non-reciprocal 45-degree polarization rotator 103 (due to temperature change, wavelength change, and fabrication variation, etc. therein) in the forward transmission direction. The signal light reflected by the mirror 104 again passes through the non-reciprocal 45-degree polarization rotator 103, wherein its polarization direction cumulatively rotates (45+A) degrees anti-clockwise (viewed along the light transmission direction). When the reflected signal light exits the non-reciprocal 45-degree polarization rotator 103, its polarization direction has rotated (90+2A) degrees in total in the forward and backward transmission directions.

In the backward transmission path, the previously horizontally polarized signal light has its polarization state has rotated (90+2A) degrees. Only the vertical polarization component of the originally horizontally polarized light can be transmitted and coupled to the collimator in reverse to the forward transmission path of the vertically polarized light. In contrast, when the horizontal polarization component of the previously horizontally polarized light is deflected by the pair of polarizing splitting prisms 102 and cannot be coupled to the collimator 101 in the opposite transmission direction. As a result, the rotation angle deviation of 2A caused by the non-reciprocal 45-degree polarization rotator 103 (due to temperature change, wavelength change, and fabrication variation, etc. therein) is eliminated, thus improving the extinction ratio.

In summary, the vertically polarized light is rotated by (90+2A) degrees (A being a small angle) and become approximately parallel to the horizontal direction in the backward transmission direction; the horizontally polarized light is rotated by (90+2A) degrees (A being a small angle) and become approximately parallel to the vertical direction in the backward transmission direction. In the backward transmission direction, the pair of polarizing splitting prisms 102 reflects the signal light in such way that only the component of the originally vertically polarized light that is parallel to the horizontal direction and the component of the originally horizontally polarized light that is parallel to the vertical direction can be directed to re-enter the collimator 101. Moreover, since A is a small angular deviation, very small amount of signal light intensity is lost in the process.

Example 2

The components of the high extinction-ratio rotator 100 are the same as those in Example 1, except that used in place of instead of the C-shaped magnetic ring 105, a square magnetic block is placed adjacent to the non-reciprocal 45-degree polarization rotator 103 to provide the magnetic field in and around the non-reciprocal 45-degree polarization rotator 103.

It should be understood that other variations in structures and optical paths than those described in Examples 1 and 2 can be compatible with the disclosed high extinction-ratio rotator 100. For example, a latching rotator crystal can be incorporated in place of the non-reciprocal 45-degree polarization rotator 103 and a C-shaped magnetic ring or a square magnetic block to provide the magnetic field in and around the non-reciprocal 45-degree polarization rotator. The latching rotator crystal includes an intrinsic magnetic field.

The implementation of the invention is described above with the attached figures, but the invention is not limited to the above specific implementation. The above specific implementation is schematic rather than limiting the invention. Ordinary technical personnel in the art should understand that they can still modify the technical solutions recorded in the above embodiments, or replace some or all of the technical features equally. However, these modifications or substitutions do not make the essence of the corresponding technical solutions separate from the scope of the technical solutions of the embodiments of the invention, which should be covered in the scope of the claims and specifications of the invention.

The invention claimed is:

1. A high extinction-ratio optical rotator, comprising:
a collimator configured to collimate a signal light from an optical fiber;
a pair of polarizing splitting prisms, comprising:
a first birefringent crystal wedge; and
a second birefringent crystal wedge,
wherein the first birefringent crystal wedge has a first optical axis parallel to a vertical plane, wherein the second birefringent crystal wedge has a second optical axis perpendicular to the vertical plane,
wherein the signal light output from the collimator passes through the pair of polarizing splitting prisms, wherein the polarizing splitting prism is configured to separate two orthogonal polarization components of the signal light into a vertically polarized light and a horizontally polarized light;
a non-reciprocal 45-degree polarization rotator,
wherein the vertically polarized light and the horizontally polarized light exiting the pair of polarizing splitting prisms pass through the non-reciprocal 45-degree polarization rotator in a forward transmission direction; and
a reflector,
wherein the vertically polarized light and the horizontally polarized light exiting the non-reciprocal 45-degree polarization rotator intersect on a surface of the reflector, wherein the reflector is configured to reflect the signal light exiting the non-reciprocal 45-degree polarization rotator back into the non-reciprocal 45-degree polarization rotator in a backward transmission direction.

2. The high extinction-ratio optical rotator of claim 1, wherein the non-reciprocal 45-degree polarization rotator is configured to respectively rotate polarization directions of the vertically polarized light and the horizontally polarized light clockwise by (45+A) degrees in the forward transmission direction, wherein A is an angular deviation in the polarization direction caused by the non-reciprocal 45-degree polarization rotator.

3. The high extinction-ratio optical rotator of claim 2, wherein the non-reciprocal 45-degree polarization rotator is configured to respectively rotate polarization directions of the vertically polarized light and the horizontally polarized light counterclockwise by (45+A) degrees in the backward transmission direction.

4. The high extinction-ratio optical rotator of claim 1, wherein in the backward transmission direction, the vertically polarized light includes a horizontal polarization component, and the horizontally polarized light includes a vertical polarization component.

5. The high extinction-ratio optical rotator of claim 4, wherein the pair of polarizing splitting prisms are configured to direct the horizontal polarization component of the vertically polarized light back into the collimator, wherein the pair of polarizing splitting prisms are configured to direct the vertical polarization component of the horizontally polarized light back into the collimator.

6. The high extinction-ratio optical rotator of claim 5, wherein the first birefringent crystal has wedge angles $\alpha$ and $\beta$, wherein the first birefringent crystal has an optical axis having an azimuth angle $\theta$ in the vertical plane, wherein the second birefringent crystal has wedge angles $\alpha$ And $\gamma$, wherein the second birefringent crystal has an optical axis vertical to vertical plane, wherein $\alpha=5.3°$, $\beta=4.5°$, $\gamma=4.9°$, and $\theta=49.2°$.

7. The high extinction-ratio optical rotator of claim 1, wherein the first birefringent crystal wedge and the second birefringent crystal wedge are bonded to form an integrated component.

8. The high extinction-ratio optical rotator of claim 1, further comprising:
a magnet positioned adjacent to or around the non-reciprocal 45-degree polarization rotator and configured to produce a magnetic field in the non-reciprocal 45-degree polarization rotator, wherein the magnetic field enables the non-reciprocal 45-degree polarization rotator to produce a non-reciprocal rotation of the polarization direction.

9. The high extinction-ratio optical rotator of claim 8, wherein the magnet has a C-shaped unclosed magnetic ring structure.

10. The high extinction-ratio optical rotator of claim 8, wherein the magnet has a structure of a square magnetic block.

11. The high extinction-ratio optical rotator of claim 1, wherein the non-reciprocal 45-degree polarization rotator has an intrinsic magnetic field.

12. The high extinction-ratio optical rotator of claim 11, wherein the non-reciprocal 45-degree polarization rotator is made of a latching rotator crystal.

13. The high extinction-ratio optical rotator of claim 1, wherein the collimator is in the form of an optical fiber having an end face connected with an endcap or a thermal-expanded-core optical fiber.

* * * * *